United States Patent [19]
Doan et al.

[11] Patent Number: 5,940,960
[45] Date of Patent: Aug. 24, 1999

[54] AUTOMATIC VALVE STEMMING METHOD AND APPARATUS

[75] Inventors: Paul G. Doan, Warren; Dean A. Colwell, Chesterfield Township, both of Mich.

[73] Assignee: Fori Automation, Inc., Shelby Township, Mich.

[21] Appl. No.: 08/786,560

[22] Filed: Jan. 21, 1997

[51] Int. Cl.$^6$ ................................................. B23P 19/00
[52] U.S. Cl. ............................. 29/714; 29/717; 29/221.5
[58] Field of Search .............................. 29/221.5, 407.04, 29/407.09, 407.1, 890.123, 890.124, 712, 714, 717, 720

[56] References Cited

U.S. PATENT DOCUMENTS

| | | | |
|---|---|---|---|
| 2,855,015 | 10/1958 | Atkin | 29/890.123 |
| 4,353,156 | 10/1982 | Rosaz | 29/221.5 |
| 4,409,718 | 10/1983 | Pryor | 29/407.04 |
| 4,858,667 | 8/1989 | Igari et al. | 241/85 |
| 4,866,834 | 9/1989 | Winkler et al. | 29/568 |
| 5,170,828 | 12/1992 | Curcuri | 157/1 |
| 5,289,634 | 3/1994 | Makino et al. | 29/407.1 |
| 5,303,463 | 4/1994 | Pollard | 29/705 |
| 5,450,886 | 9/1995 | Girard | 152/427 |
| 5,455,765 | 10/1995 | Pryor | 29/407.04 |
| 5,727,300 | 3/1998 | Ekdahl et al. | 29/407.04 |
| 5,749,141 | 5/1998 | Matsumoto | 29/714 |

FOREIGN PATENT DOCUMENTS

| | | |
|---|---|---|
| 52-26668 | 8/1975 | Japan. |
| 949078 | 2/1964 | United Kingdom. |

*Primary Examiner*—Paul T. Sewell
*Assistant Examiner*—J. Mohandesi
*Attorney, Agent, or Firm*—Reising, Ethington, Barnes, Kisselle, Learman & McCulloch, P.C.

[57] ABSTRACT

A method and apparatus for automatically inserting valve stems of varying sizes into wheels of various sizes in which the appropriate valve stem size is selected by analyzing images of the wheel detected by a camera. The camera is used to determine the diameter, width, and color or contrast of the wheel as well as to determine when a valve stem opening in the wheel is in a proper position for insertion of a valve stem.

21 Claims, 15 Drawing Sheets

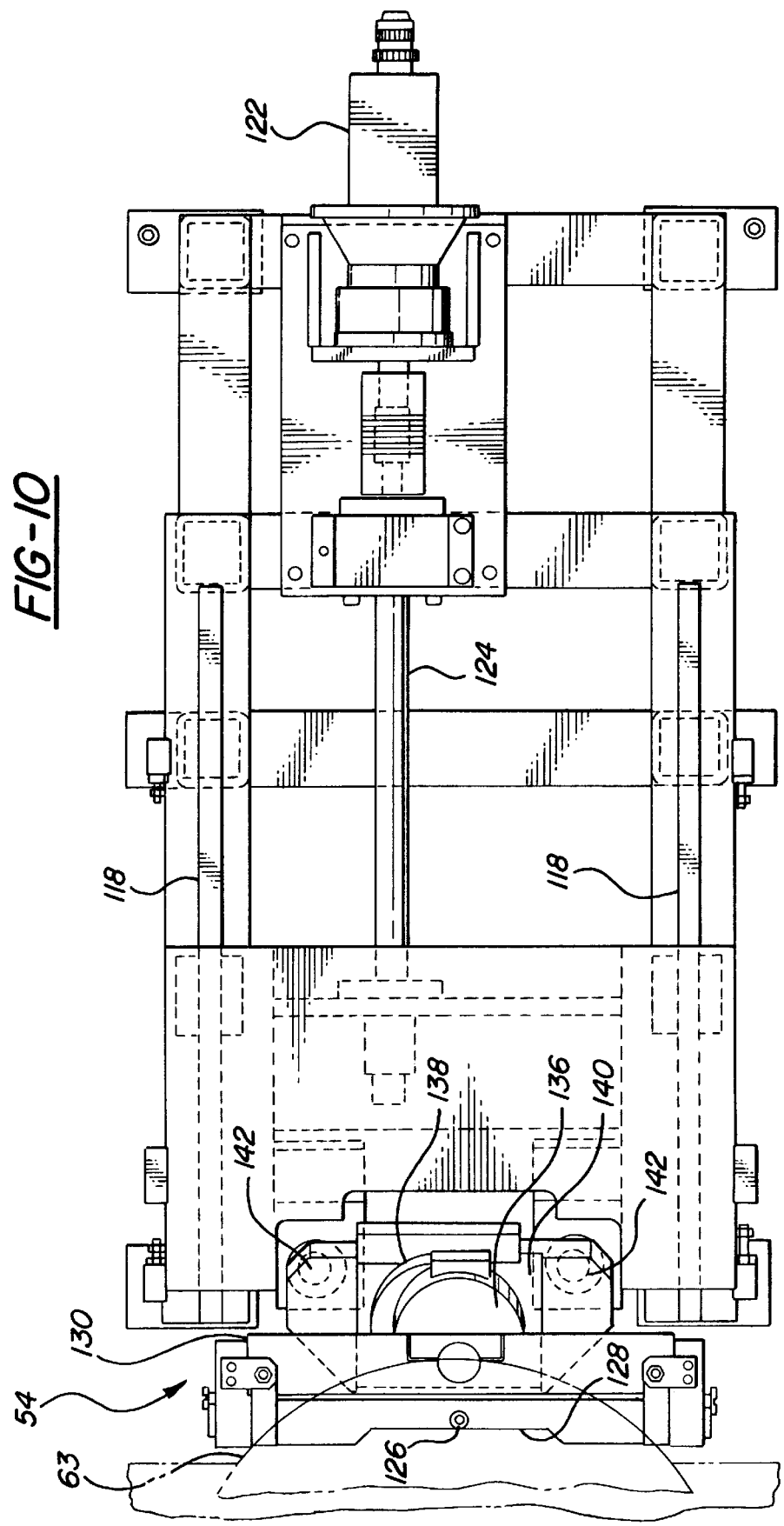

AUTOMATIC VALVE STEMMING METHOD AND APPARATUS

TECHNICAL FIELD

The subject invention relates to a method and apparatus for automatically inserting valve stems into wheels.

BACKGROUND OF THE INVENTION

In the assembly of automotive wheels and tires, a tire is mounted onto a wheel and then inflated. Prior to mounting the tire, a valve stem must be inserted into a valve stem opening in the wheel to permit inflation of the tire. For manufacturing wheels on a large production scale, machines are used to automatically insert the valve stems into the wheels. Because wheels of different sizes require different sized valve stems, valve stemming machines must either operate on wheels of a single size or be able to accommodate the use of several sizes of valve stems. For example, some prior art devices utilize a rotatable carousel to dispense valve stems of varying sizes onto a valve stem insertion tool.

Other prior art devices include mechanisms for detecting the wheel size and providing the appropriate valve stem based upon the wheel size. For example, U.S. Pat. No. 4,353,156 to Rosaz discloses a valve stemming machine that accommodates different wheel sizes by relying on the consistency among different sized wheels of (1) the angle between the wheels rotational axis and the normal to the valve bearing face and (2) the distance from the center of the valve hole to the wheel's edge, measured in the valve bearing plane. By inserting valve stems based upon these two geometric features, different sized wheels can be accommodated without knowing further information about the wheels.

Valve stemming machines generally rotate the wheel and detect when the valve stem opening is aligned with a valve stem insertion tool. Unfortunately, prior art machines for detecting the position of the valve stem opening are generally imprecise. In the Rosaz '156 reference, the machine includes both a valve hole detection station and an insertion station at different locations about the circular path through which the rim of the wheel is rotated. The wheel is rotated while light at the detection station shines upwardly at the wheel. When the valve hole reaches the detection station, light passes through the valve hole and strikes a detection cell. Rotation is continued at a slower speed using a drive roller that is rotated through a fixed angle to align the valve hole with the insertion station. As will be appreciated, alignment between the valve hole and the insertion station is not actually detected or confirmed, but is assumed based upon the fixed angular rotation. Consequently, slippage between the drive roller and wheel, differences in diameters of the wheels, and other such factors can adversely affect the accuracy of the final positioning of the valve hole at the insertion station. Also, depending upon the sensitivity of the detection cell and the intensity of outside light, the precise position at which the valve stem opening is detected can vary significantly.

Some prior art devices which utilize a photodetection cell similar to the Rosaz '156 reference will rotate the wheel at high speed until the valve stem opening is first detected, stop the wheel, and then reverse the rotation of the wheel at slow speed until the valve stem opening is detected again. However, this method still does not significantly improve the accuracy of detecting a valve stem opening with a photodetection cell.

If the valve stem opening is not precisely aligned with the valve stem insertion tool, relative adjustment between the valve stem insertion tool and the wheel can be required. In the Rosaz '156 reference, a recentering spindle is utilized to center the valve stem opening with the valve stem insertion tool. The requirement for a separate device to center the valve stem opening increases the cost and complexity of the machine, and the prior art does not provide for a valve stem insertion tool which is universally adjustable to avoid the need for extraneous centering devices.

SUMMARY OF THE INVENTION

The present invention provides a method for inserting valve stems into wheels including detecting an image of the wheel with a camera, rotating the wheel until a valve stem opening within the wheel is in a predetermined position within the camera image, and positioning a valve stem within the valve stem opening.

The present invention also provides a method for processing a wheel including detecting the wheel with an optical sensor and analyzing a signal from the optical sensor to determine a size characteristic of the wheel.

The present invention also provides a valve stem insertion tool including a first support structure rotatably supported on a second support structure for rotational movement about a first axis. The second support structure is supported for rotation on a third support structure about a second axis parallel to the first axis. A valve stem holder is supported on the first support structure in a position offset from the first and said second axes.

By utilizing a camera in the present invention, various wheel size characteristics can be measured in a highly accurate and efficient manner. The measured wheel size characteristics can then be used to determine an appropriate valve stem size for the wheel. In addition, the location of the valve stem opening in the wheel can also be detected by the camera in a highly accurate and efficient manner.

The camera can also be made part of a single station for measuring the wheel size characteristics, locating the valve stem openings in the wheels, and inserting the valve stems in the wheels to thereby eliminate the need for a separate station for measuring wheel size characteristics.

Finally, the valve stem insertion tool of the present invention is adjustable in several directions to permit the valve stem holder to compensate for the location and angle of the valve stem opening in the wheel.

DESCRIPTION OF THE DRAWINGS

Other advantages of the present invention will be readily appreciated from the following detailed description of the invention when considered in connection with the accompanying drawings wherein:

FIG. 10 is a top view of the valve stem insertion tool in position for inserting a valve stem within a wheel;

BEST MODE FOR CARRYING OUT THE INVENTION

Figure 1:
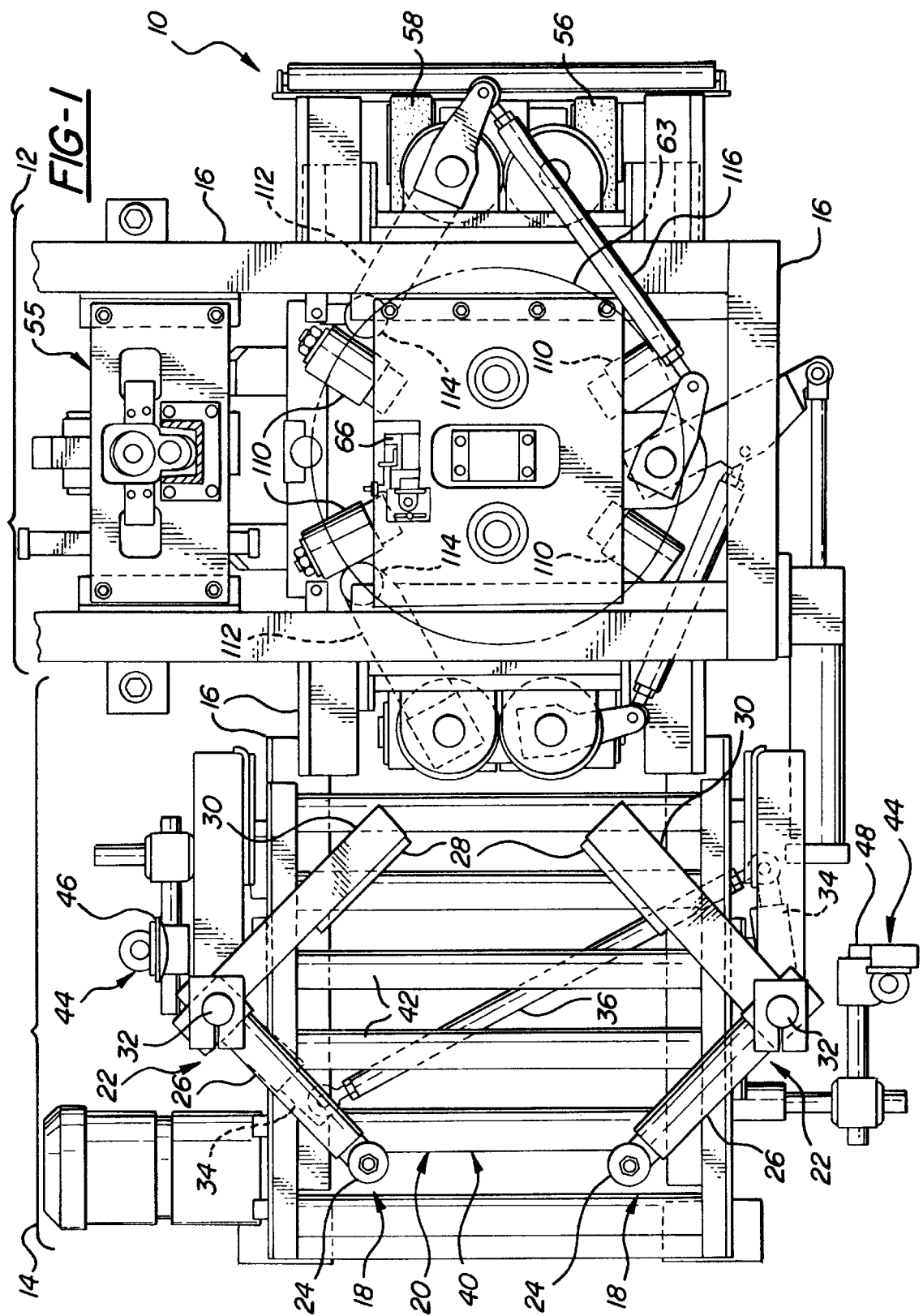
FIG. 1 is a top view of the valve stemming apparatus of the present invention.
Figure 2:
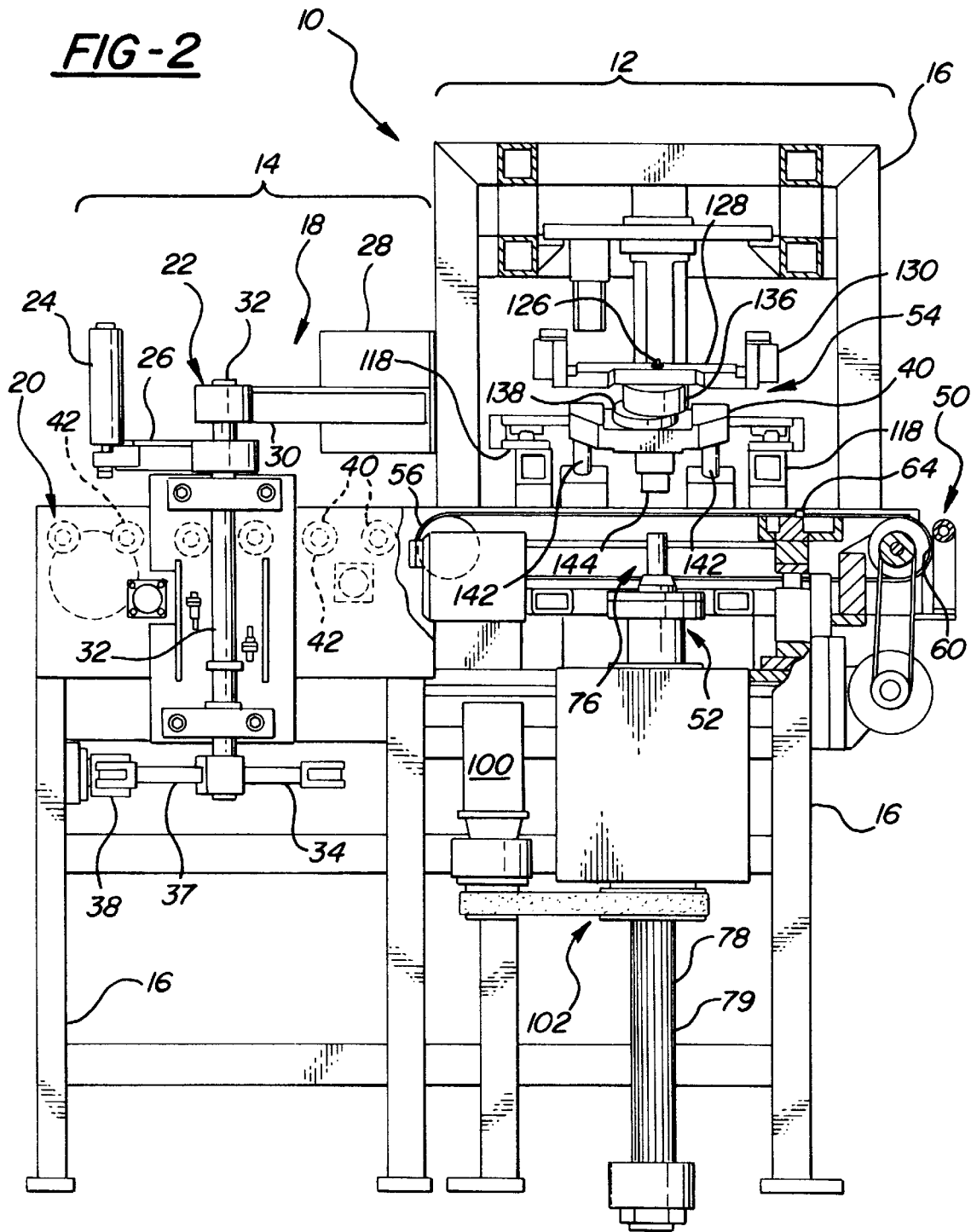
FIG. 2 is a side view of the present invention.

The subject invention generally relates to a valve stemming method and apparatus for inserting valve stems into wheels. Referring to FIGS. 1 and 2, the apparatus 10 includes an operation station 12 for performing the operations related to inserting the valve stems into the wheels and a retaining apparatus 14 for preventing a wheel from entering the operation station 12 until work on a preceding wheel has been completed. A continuous series of wheels are fed into the apparatus 10 and travel from left to right as viewed in FIG. 1. The operation station 12 and retaining apparatus 14 are supported by a frame 16, and a controller (not shown) directs the operation of the apparatus 10. For clarification, the term "wheel" as used throughout the specification indicates only a wheel rim, as opposed to an assembled tire and rim.

Figure 3:
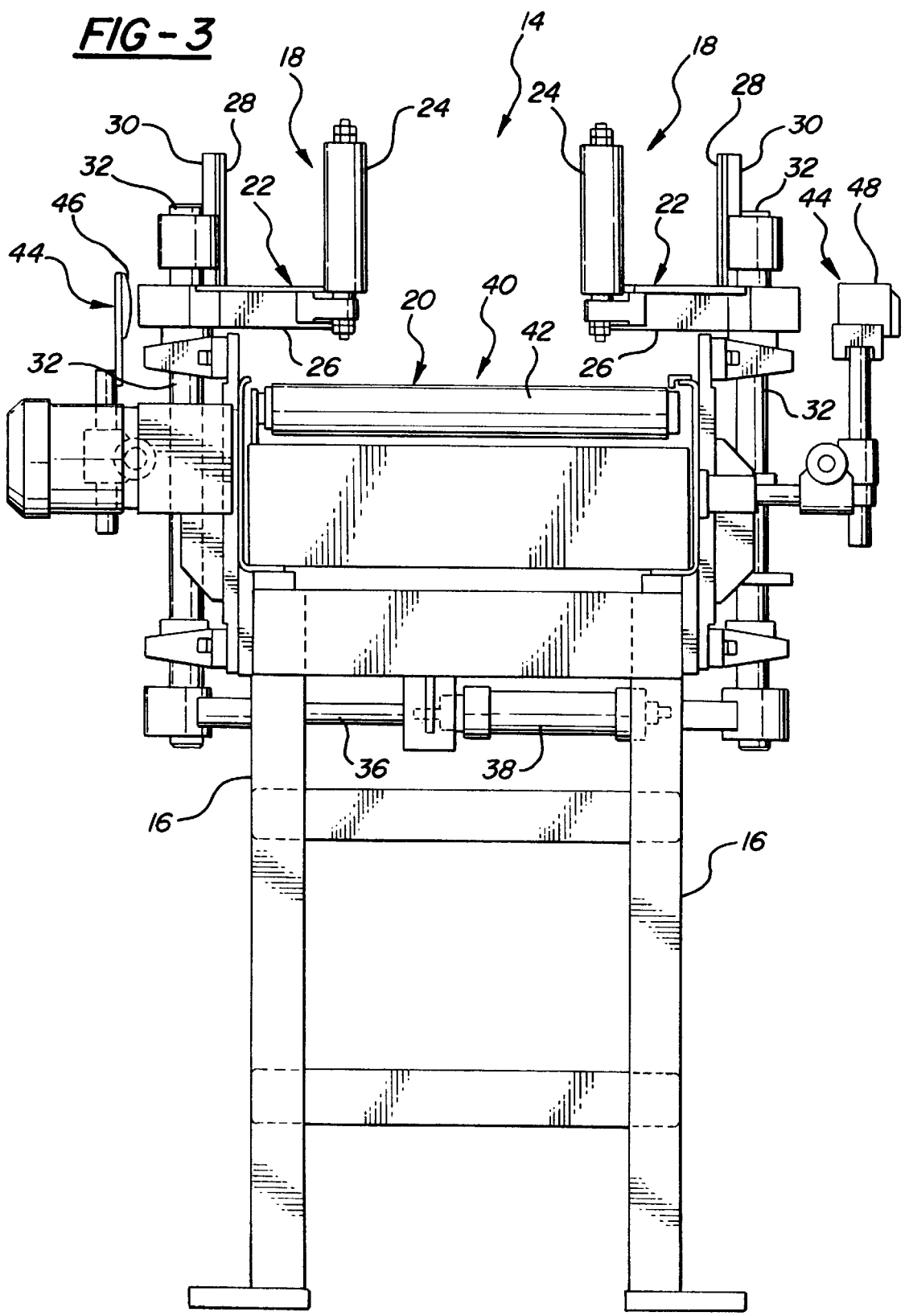
FIG. 3 is an end view of the retaining apparatus of the present invention.

The retaining apparatus 14 is shown in FIGS. 1–3 and includes a gate 18 and a roller conveyor 20. The gate 18 comprises a pair of retaining arms 22 each including a padded vertical roller 24 supported on a first support arm 26 and a rectangular pad 28 supported on a second support arm 30. The retaining arms 22 are each mounted on a vertical shaft 32 which is rotatable relative to the frame 16. Thus, rotation of each vertical shaft 32 causes corresponding movement of the padded vertical roller 24 and rectangular pad 28 supported on the shaft 32. For example, if a wheel is positioned on the roller conveyor 20, rotation of the vertical shaft 32 which causes the padded vertical roller 24 to move toward the wheel will cause the rectangular pad 28 to move away from the wheel.

As shown best in FIG. 1, the vertical shafts 32 are joined together through a mechanical linkage such that the vertical shafts 32, and retaining arms 22 supported thereon, will move together in unison. The mechanical linkage comprises a connector arm 34 extending from each vertical shaft 32 and a connector rod 36 joining the connector arms 34 together. An actuator arm 37 (shown in FIG. 2) is joined to one of the two vertical shafts 32, and an actuation cylinder 38 pushes or pulls, as appropriate, the actuator arm to cause rotation of the vertical shafts 32 and corresponding movement of the retaining arms 22.

The roller conveyor 20 comprises a series of horizontal rollers 40 supported on the frame 16. The rollers 40 each comprise an inner core (not shown) and a nylon outer sleeve 42 surrounding the inner core and rotatable thereabout. The inner core of each roller 40 is driven by a chain drive mechanism (not shown) and the weight of a wheel placed on the roller conveyor 20 causes frictional engagement between the outer sleeve 42 and inner core together to propel the wheel. The inner cores are constantly driven by the chain drive even when the wheels are stopped by the retaining arms 22. However, when the wheels are stopped, the inner cores will rotate within the outer sleeves 42 as opposed to the outer sleeves 42 rotating against the wheel because the friction between the wheel and the outer sleeves 42 is greater than the friction between the inner core and the outer sleeves 42. This will prevent scratching and damage to the wheel which could be caused by rubbing of the outer sleeves 42 against the wheel.

The retaining apparatus 14 includes a first detection switch 44 for determining when a wheel is located within the retaining apparatus 14. The first detection switch 44 comprises a reflector 46 and a photodetector module 48 positioned on opposite sides of the roller conveyor 20. The photodetector module 48 includes a light source and a photocell. The light source shines a light beam at the reflector 46 which is reflected back toward the photocell unless an object is positioned between the light source and the reflector 46. If the photocell is not receiving the reflected light, a signal is sent to the controller indicating that a wheel is in position on the roller conveyor. Conversely, if the light beam is reflected to the photocell, a signal is sent to the controller indicating that a wheel is not in position on the roller conveyor 20.

As will be described in more detail below, the retaining apparatus 14 ensures that wheels are fed into the operation station 12 one at a time and only when work on a preceding wheel has been completed within the operation station 12. Specifically, the retaining arms 22 perform the dual function of preventing wheels from entering the operation station 12 at inappropriate times as well as separating a single wheel from a continuous row of wheels for passage into the operation station 12.

Figure 4:
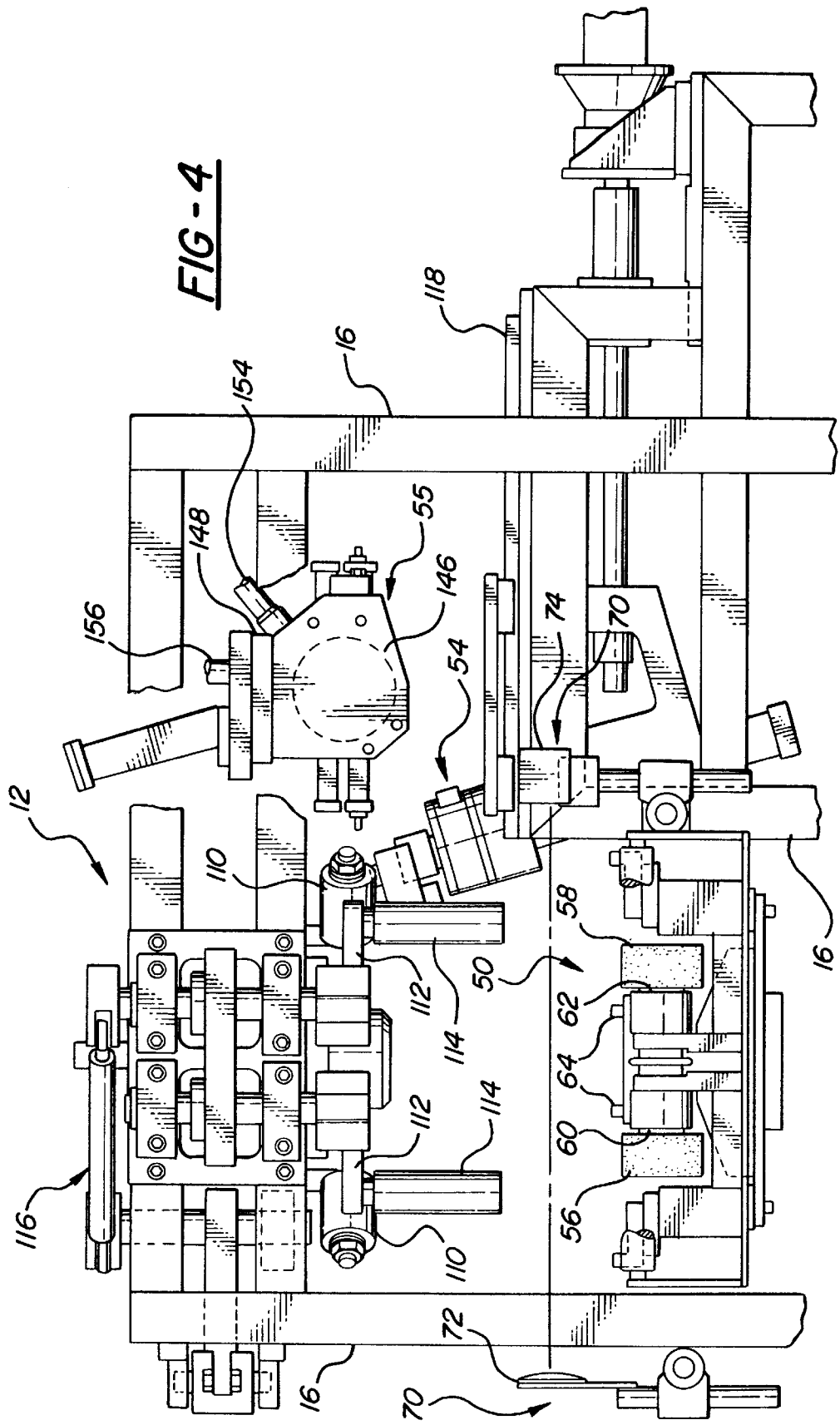
FIG. 4 is an end view of the operation station of the present invention.
Figure 5:
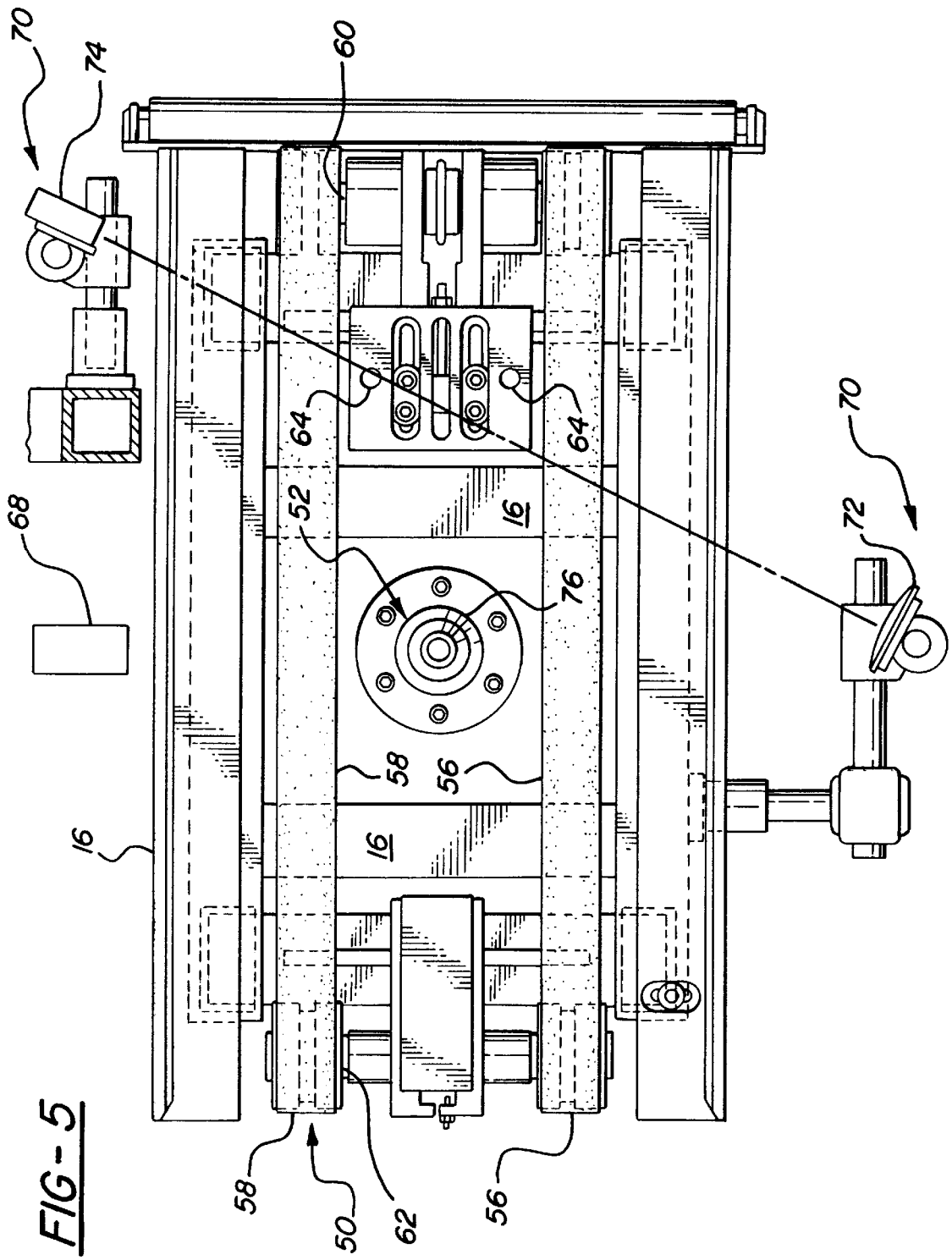
FIG. 5 is a top view of the operation station illustrating the belt conveyor of the present invention.
Figure 6:
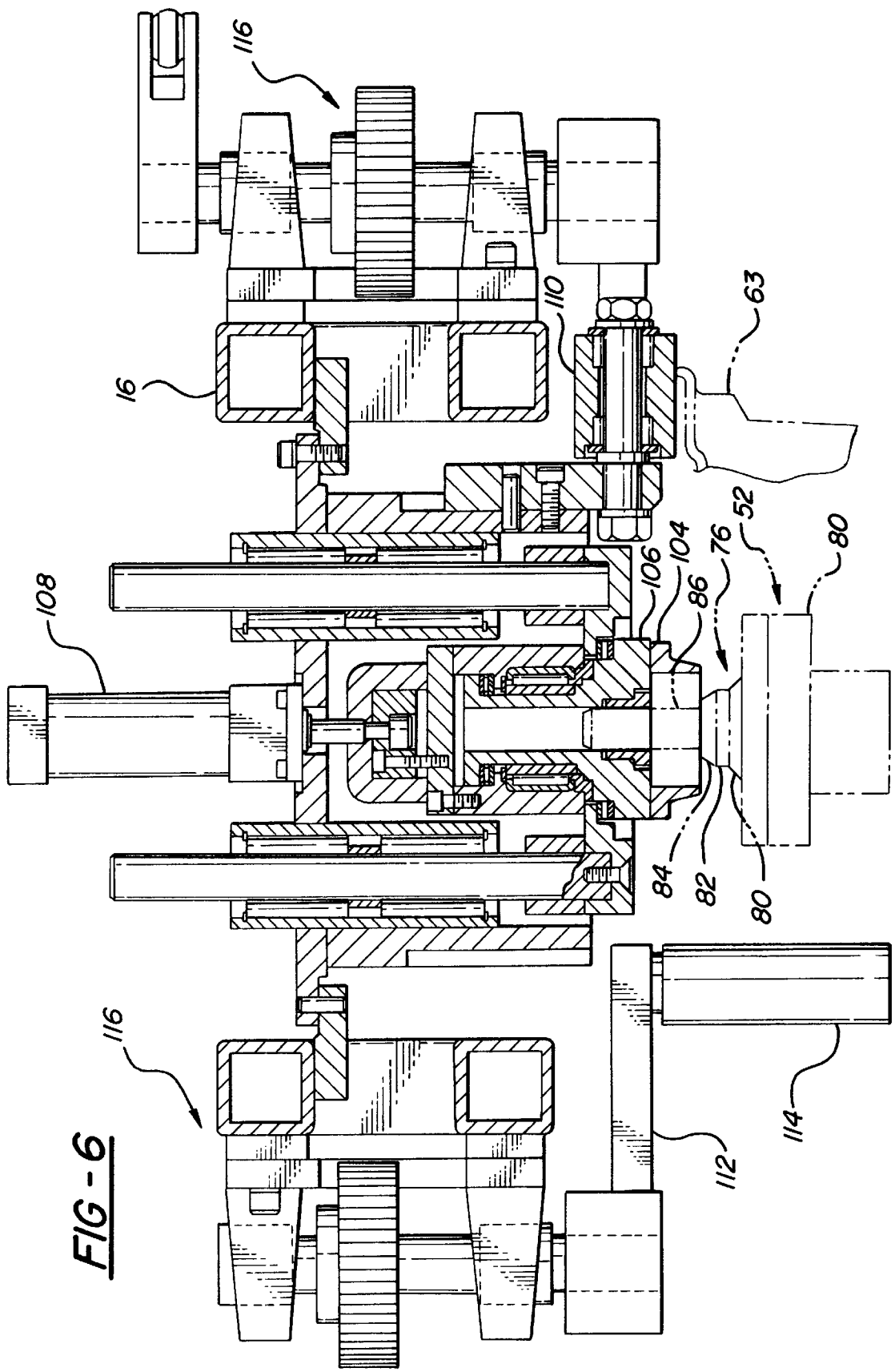
FIG. 6 is a cross-sectional view of the assembly above the belt conveyor in the operation station.

Referring to FIGS. 1, 2, and 4–7, The operation station 12 includes a belt conveyor 50, a lifting assembly 52, a valve stem insertion tool 54, and a valve stem loader 55. The belt conveyor 50 is shown best in FIGS. 2, 4, and 5 and comprises first and second belts 56,58 which are spaced apart and disposed about first and second horizontal conveyor pulleys 60,62. The belt conveyor 50 is positioned immediately adjacent the roller conveyor 20 in the retaining apparatus 14 to facilitate a smooth transition of the wheels from the roller conveyor 20 to the belt conveyor 50. In FIGS. 1 and 6, a wheel is shown at 63 in phantom in the operation station 12.

A pair of retractable stops 64 are shown in FIGS. 4 and 5 and are located between the first and second belts 56,58. The stops 64 comprise short, cylindrical projections which can extend upwardly above the level of the belt conveyor 50. When extended, the stops 64 block forward progress of a wheel after the wheel has reached a desired position. After the valve stemming apparatus 10 has completed work on the wheel, the stops 64 can be retracted to permit the wheel to continue forward movement along the belt conveyor 50.

Figure 4A:
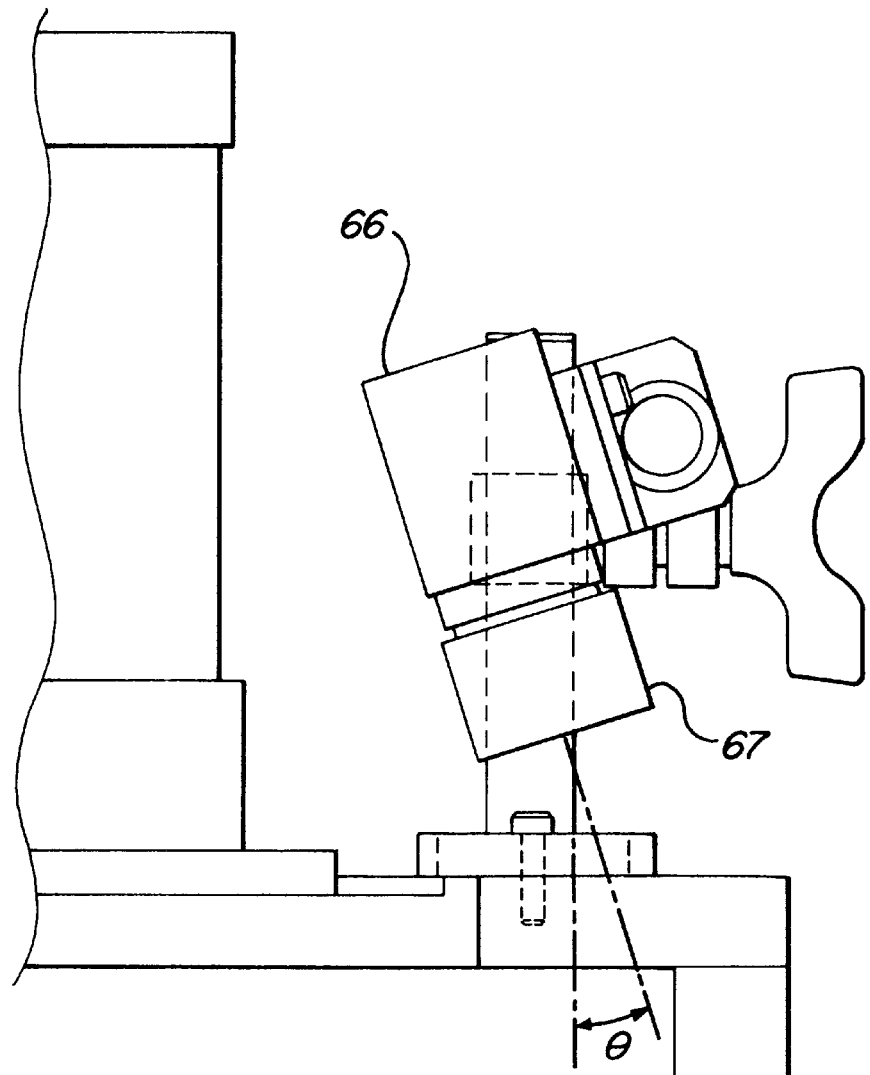
FIG. 4A is a side view of the camera of the present invention.

As shown in FIGS. 1 and 4A, a camera 66 is supported on frame above the belt conveyor and detects images of a wheel to determine size characteristics of the wheel as well as the location of a valve stem opening within the wheel. The camera includes a lens 67 which is oriented at a 20 to 25 degree angle $\theta$ in the preferred embodiment, although the angle $\theta$ can be adjusted to optimize the camera 66 for the particular wheels being worked on. As shown in FIG. 5, a rectangular light source 68 is positioned beneath the level of the belt conveyor 50 and beneath the valve stem insertion tool 54. When a wheel is in position within the operation station 12, the wheel will be between the camera 66 and light source 68. Thus, the light source 68 will clearly define the outline of the wheel within the camera image. The light source 68 will also illuminate the valve stem opening in the wheel when the valve stem opening is in position relative to the valve stem insertion tool 54. The controller analyzes images from the camera 66 to control the operation of the valve stemming apparatus 10. The operation and use of the camera 66 will be discussed in more detail below.

As shown in FIGS. 4 and 5, the operation station 12 includes a second detection switch 70 for detecting when a wheel is in position within the operation station 12. The second detection switch comprises a reflector 72 and a photodetector module 74 positioned on opposite sides of the belt conveyor 50. The photodetector module 74 includes a light source and a photocell. Similar to the first detection switch 44, if the photocell is not receiving light reflected by the reflector, a signal is sent to the controller indicating that a wheel is in position on the belt conveyor 50. Conversely, if the light beam is reflected to the photocell, a signal is sent to the controller indicating that a wheel is not in position on the belt conveyor 50.

Figure 7:
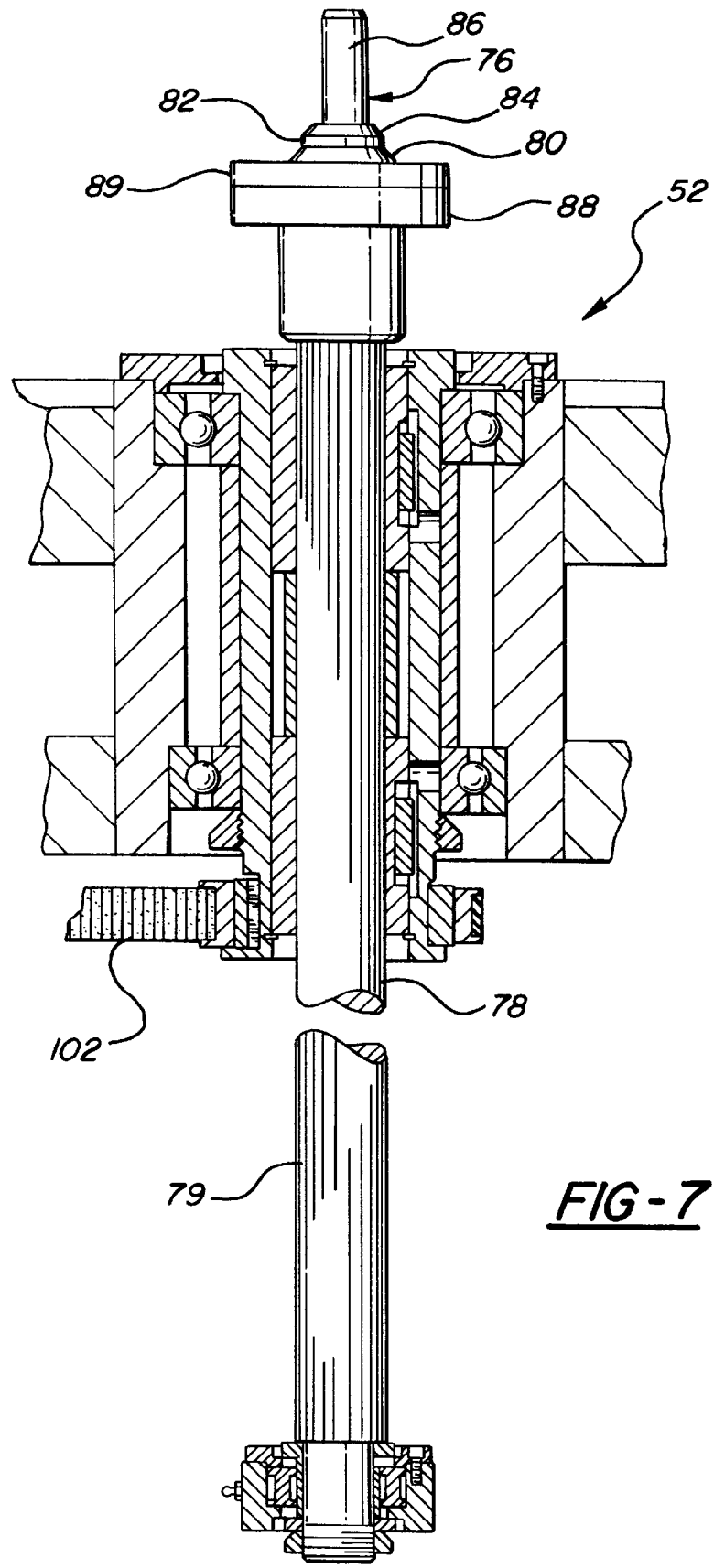
FIG. 7 is a side view of the lifting assembly of the present invention.

The lifting assembly 52 is shown in FIGS. 6 and 7 and comprises a cone 76 joined to a vertical support shaft 78 including vertical splines 79. The lifting assembly 52 is adapted to raise a wheel above the belt conveyor 50 to permit work to be done on the wheel by the valve stem insertion tool 54. The cone 76 includes a first conical locating surface 80, a cylindrical locating surface 82, a second conical locating surface 84, and a cylindrical rod 86.

Figure 8:
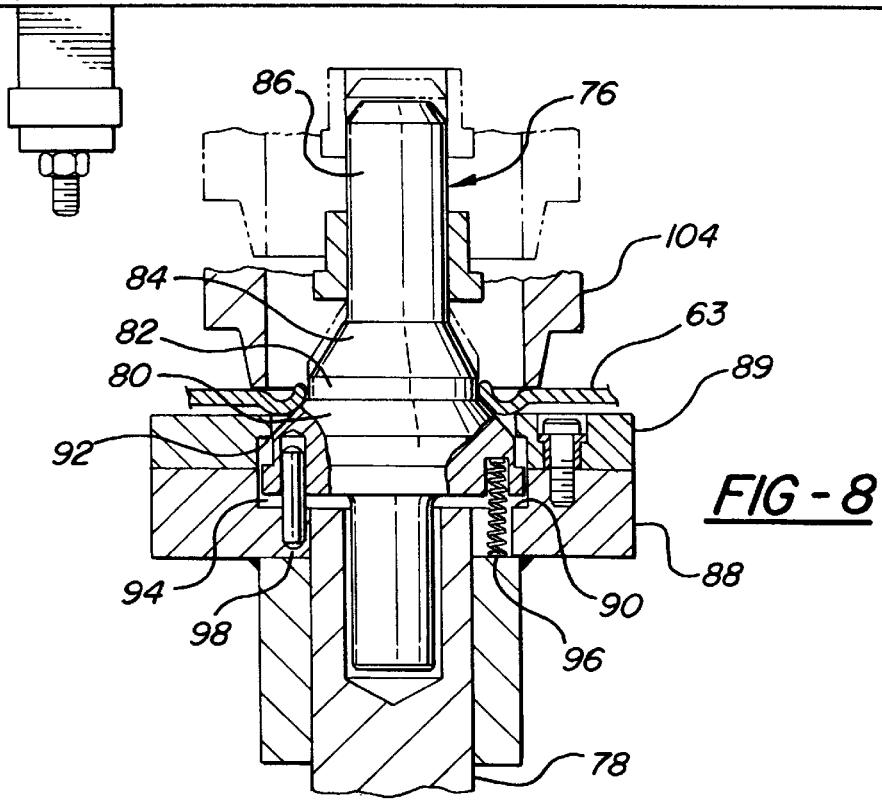
FIG. 8 is a sectional view of the lifting assembly including a cut-away illustrating the structure of the cone.

As shown in FIG. 8, the support shaft 78 includes a housing 88 and friction ring 89 surrounding the area at which the cone 76 and support shaft 78 are joined. For illustrative purposes, a wheel is shown at 63 in FIG. 8 engaged with the cone 76. The housing 88 and friction ring 89 define a pocket 90 including a retaining flange 92 which circumscribes the pocket 90 and defines an opening through which the cone 76 extends. The cone 76 also includes a base flange 94 which is contained within the pocket 90 and includes a diameter larger than the opening defined by the retaining flange 92. Thus, the pocket 90 and retaining flange 92 permit limited vertical movement of the cone 76 relative to the support shaft 78. A biasing means 96, such as a spring, biases the cone 76 upwardly within the pocket 90 to press the base flange 94 firmly against the retaining flange 92. The vertical movement of the cone 76 combined with the biasing means 96 provide a method of maintaining the location of wheels of various bore sizes about the vertical center axis of the support shaft 78 while conical surface 80 moves upward until it contacts the wheel bore.

At least one retaining pin 98 extends upwardly from the housing 88 and into the base flange 94 to prevent rotational movement of the cone 76 relative to the housing 88. The retaining pin 98 is sized so that it will not interfere with vertical movement of the cone 76 within the pocket 90.

A lifting actuation cylinder (not shown) is provided for raising and lowering the support shaft 78 and, consequently, the cone 76. In addition, as shown in FIG. 2, a motor 100 is supported on the frame 16 for rotating the support shaft 78 through a belt and pulley linkage 102. As the support shaft 78 is rotated, the housing 88, friction ring 89, and thus the cone 76 are also rotated about a vertical axis.

A cushioning pad 104 is shown in FIGS. 6 and 8 supported on the frame 16 directly above the cone 76. The cushioning pad 104 is adapted to receive a wheel 63 pressed upwardly thereagainst by the lifting assembly 52. The cushioning pad 104 is mounted to a support structure 106 which, in turn, is mounted on the frame 16 in a manner which permits vertical and rotational movement of the support structure 106. A cushioning cylinder 108 is mounted on the frame 16 above the support structure 106 and is engaged with the support structure 106 to decelerate upward movement of the cushioning pad 104 and, hence, a wheel 63 pressed thereagainst.

Four horizontal support rollers 110 are mounted on the frame 16 above the belt conveyor 50 as shown in FIGS. 1, 4, and 6. The horizontal support rollers 110 are spaced in a symmetrical pattern and are equidistant from the vertical axis of rotation of the cone 76. Each roller 110 includes a horizontal axis of rotation which intersects the vertical axis of rotation of the cone 76. The horizontal support rollers 110 are adapted to receive a wheel 63 pressed thereagainst by the cone 76 and to permit rotation of the wheel 63.

To center a wheel relative to the cone 76, four centering arms 112 are provided each including a vertical, cylindrical centering member 114. The centering arms 112 are joined by a mechanical linkage 116 to pivot inwardly and outwardly, in unison, to engage and center a wheel 63 located on the belt conveyor 50. The centering arms 112 retract after the wheel 63 is centered and before the wheel 63 is raised by the lifting assembly 52.

Figure 11:
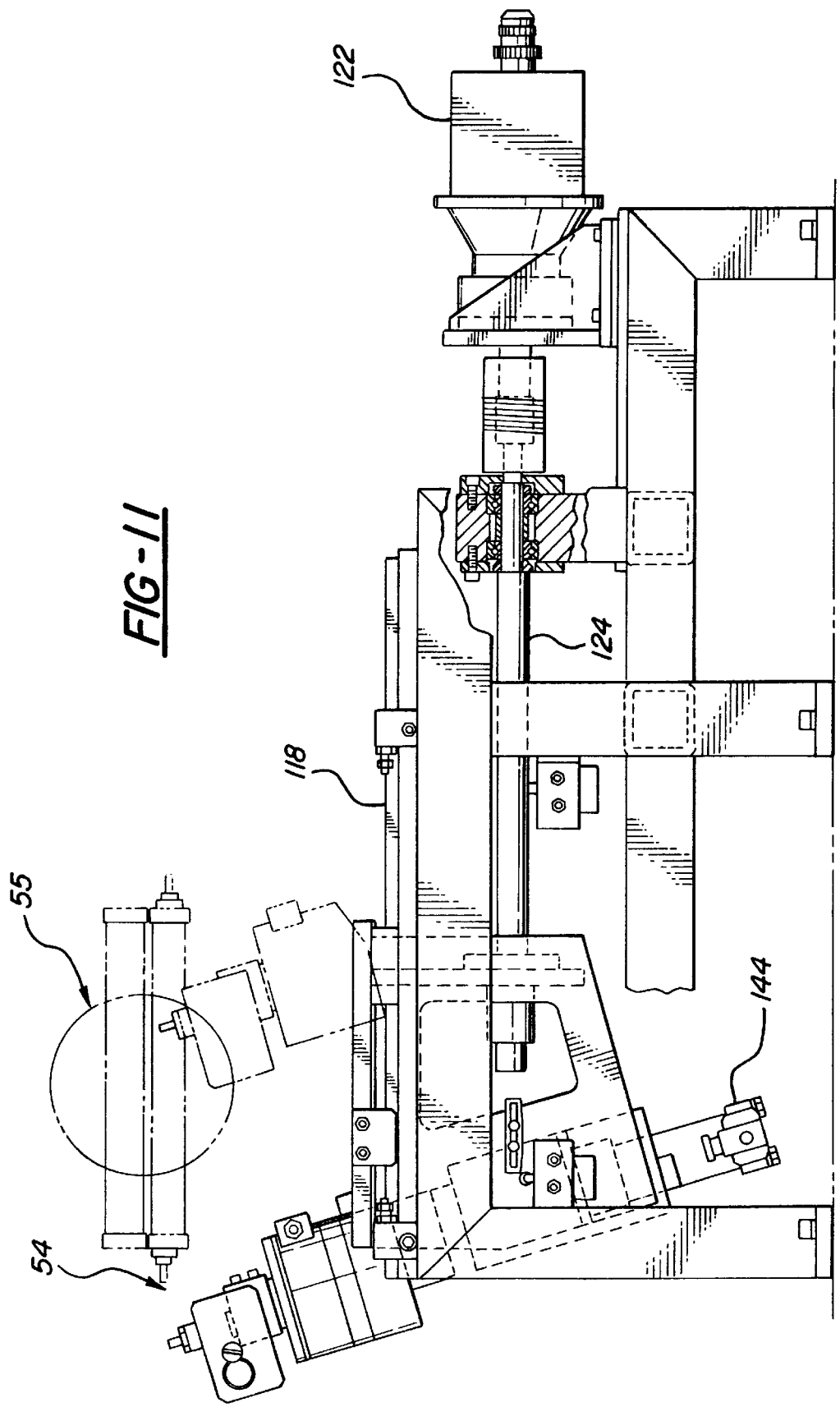
FIG. 11 is a side view of the apparatus shown in FIG. 10.

The valve stem insertion tool 54 is shown in detail in FIGS. 4 and 10–13 and is supported for sliding movement on guide rails 118 to permit movement of the valve stem insertion tool 54 toward and away from a wheel 63 supported above the belt conveyor 50. As shown in FIGS. 10 and 11, a motor 122 is mounted on the frame 16 and rotates a drive shaft 124 to move the insertion tool 54 via a ball-screw mechanism shown in FIG. 11. The valve stem insertion tool 54 moves from a retracted position adjacent the valve stem loader 55, at which the valve stems are retrieved, to a forward position adjacent the belt conveyor 50, at which the valve stems are inserted into a wheel.

Figure 12:
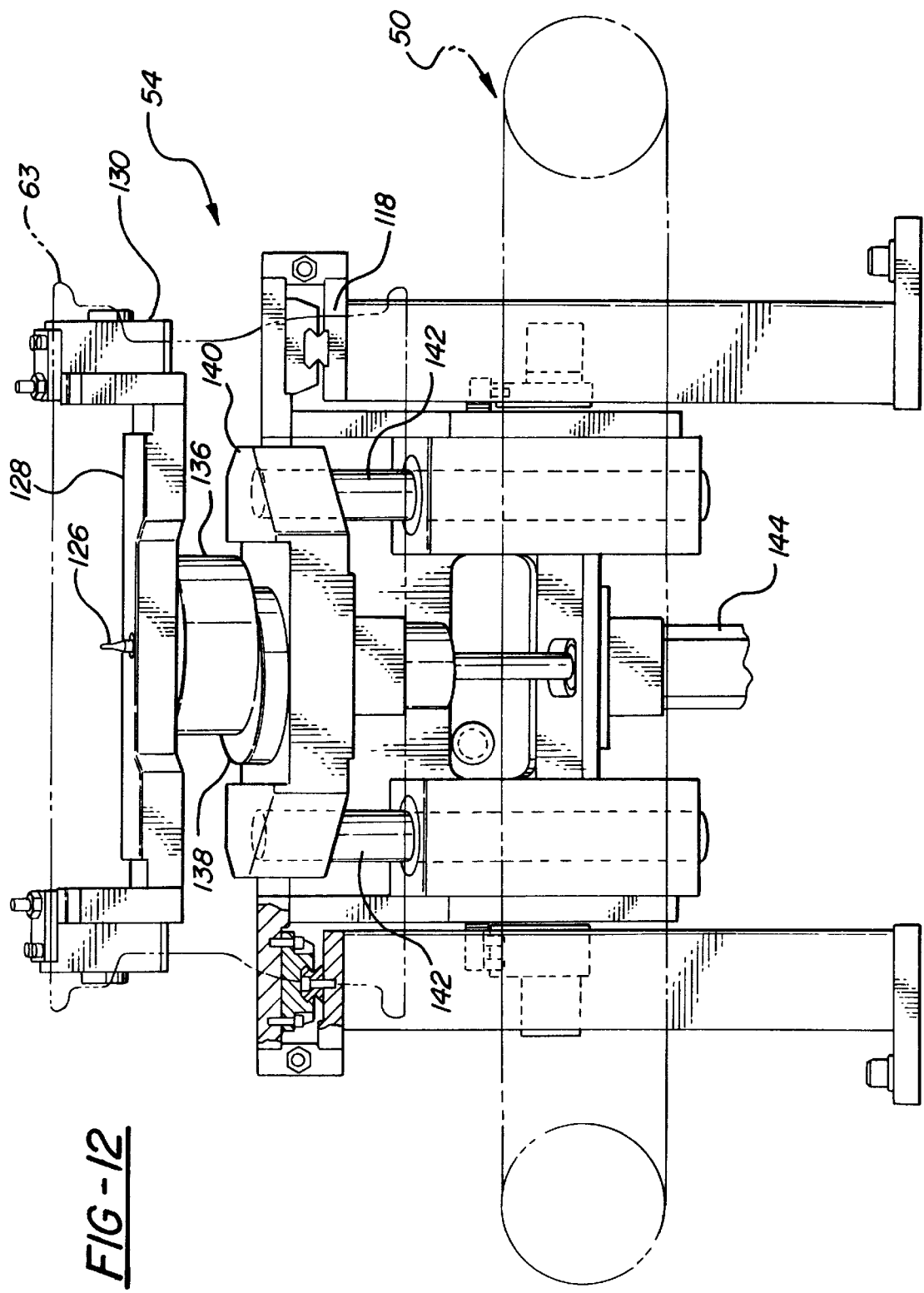
FIG. 12 is a perspective view of the valve stem insertion tool.
Figure 13:
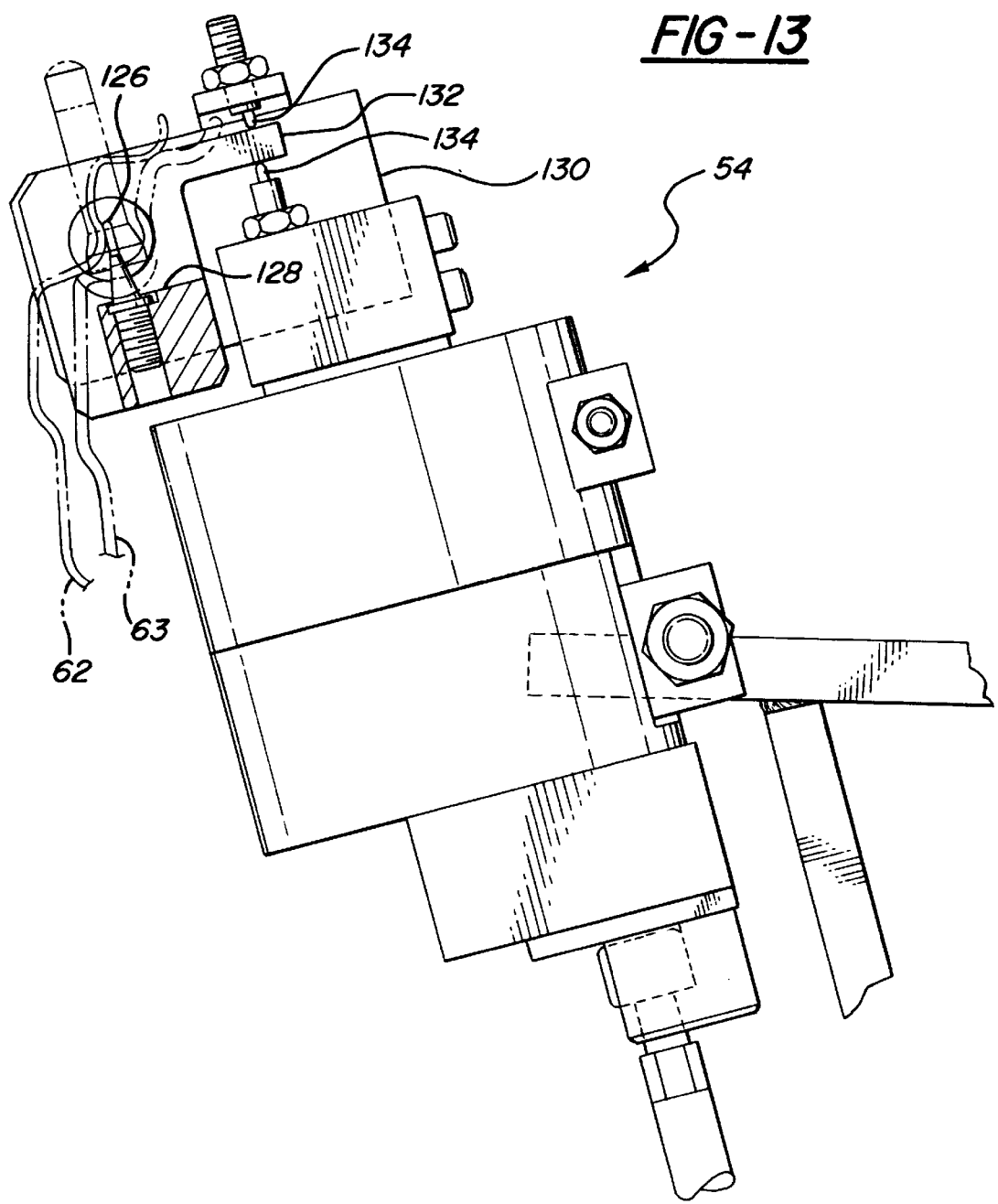
FIG. 13 is a side view of the valve stem insertion tool.

Referring to FIG. 12, the valve stem insertion tool 54 includes a valve stem holding pin 126 mounted on a bar 128 which is supported within a cradle 130 for rotation about a horizontal axis. The holding pin 126 is mounted on the bar 128 at an inclined angle which can change depending upon the degree of rotation of the bar 128. As shown in FIG. 13, each end of the bar 128 includes a lever 132 positioned between a pair of opposing spring-loaded pins 134 on the cradle 130. The pins 132 are biased equally to return the bar 128 to a starting position if the bar 128 is rotated from the starting position. A detent mechanism (not shown) on the bar 128 and cradle 130 is engaged when the bar 128 is in the starting position to further secure the bar 128 in the starting position.

The cradle 130 is rotatably mounted on a first cylindrical support member 136 for rotation about a first, generally vertical axis of rotation. The first support member 136 is also rotatably mounted on a second cylindrical support member 138 for rotation about a second axis. The second axis is parallel to the first axis and offset therefrom. Both the first and second axes are approximately 20 degrees from vertical and tilted toward the belt conveyor 50 of the operation station 12.

The valve stem holding pin 126 is offset from both the first axis and the second axis. Because the holding pin 126 is offset from the first axis, rotation of the cradle 130 will cause the holding pin 126 to pivot in a circular arc about the first axis. However, the holding pin 126 is also offset from the second axis such that rotation of the first support member will cause the cradle 130, and holding pin 126 supported thereon, to rotate about the second axis. Through a combination of rotating the cradle 130 and the first support member 136 by varying amounts, the holding pin 126 can be moved into any position within a predetermined region surrounding the first and second axes. A biasing means similar to the biasing means for rotation of the bar 128 is provided for returning the cradle 130 and first support member 136 to an initial position after rotation thereof.

During insertion of a valve stem into a valve stem opening in a wheel, the inclined angle of the valve stem holding pin 126 may be incorrect depending upon the particular size of the wheel. As long as the valve stem is at least partially inserted into the valve stem opening, the bar 128 will pivot during further insertion of the valve stem to adjust the valve stem holding pin 126 to the proper insertion angle. Further, the valve stem may not be perfectly aligned with the center of the valve stem opening depending upon the consistency of the wheels. As long as the valve stem is partially inserted into the valve stem opening, interference between the valve stem and the wheel will cause the cradle 130 and first support member 136 to rotate to accommodate the position of the valve stem opening relative to the valve stem.

The bar 128, cradle 130, and first and second support members 136,138 are all mounted on a support plate 140 which includes a pair of guide rods 142 for guiding the plate 140 in vertical movement. An air cylinder 144 is operatively engaged with the support plate 140 for moving the support plate 140 upwardly during retrieval and insertion of a valve stem and downwardly after retrieval and insertion are completed.

Figure 9:
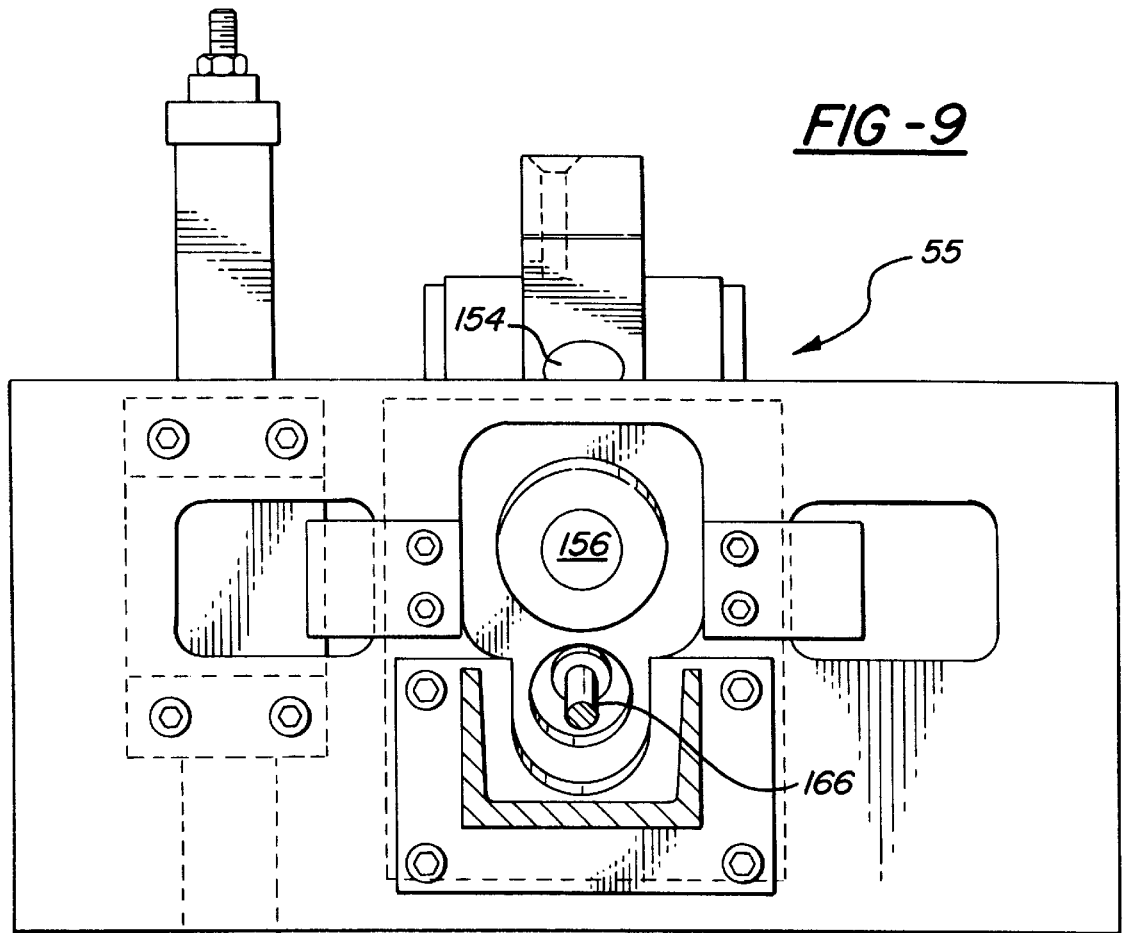
FIG. 9 is a perspective top view of the valve stem loader of the present invention.
Figure 14:
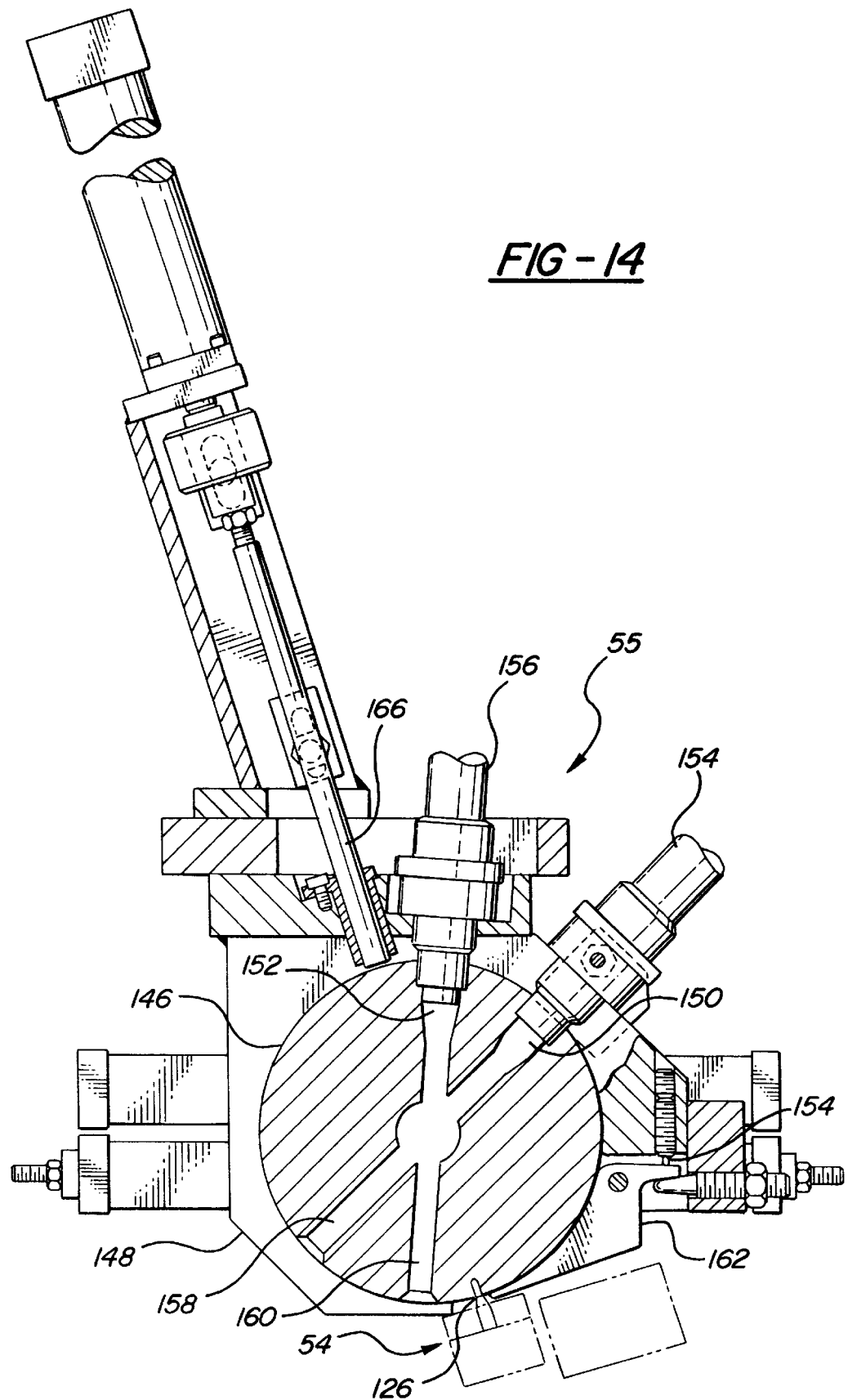
FIG. 14 is a cross-sectional view of the valve stem loader.

The valve stem insertion tool 54 retrieves valve stems from a valve stem loader 55, shown in FIGS. 4, 9, and 14. The valve stem loader 55 includes a circular disc 146 rotatably supported in a housing 148. In the preferred embodiment, first and second valve stem chambers 150,152 are included to receive valve stems of two different sizes. First and second feeding tubes 154,156 are supported on the housing 148 and joined to the first and second chambers 150,152, respectively. Additional chambers can be provided in the disc 146 to increase the amount of differently sized valve stems handled by the loader 55.

The valve stems begin in a vibratory bowl feeder (not shown) and travel into receiver blocks (not shown) which feed into the feeding tubes 154,156. When the disc 146 is in a loading position as shown in FIG. 14, pressurized air drives the valve stems along the feeding tubes 154,156 to place the valve stems within the circular disc 146. The valve stems each include a larger head portion and a tail portion, and the valve stems are inserted tail first into the appropriate valve stem chamber 150,152. First and second passages 158,160 extend from the first and second chambers 150,152, respectively, across the circular disc 146 to provide access from the opposing side of each chamber 150,152.

To load a valve stem onto the valve stem insertion tool 54, the circular disc 146 is rotated until the desired size valve stem is located in the position adjacent the holding pin 126 shown in phantom in FIG. 14. A pivotable valve gate 162 holds the valve stem within the circular disc 146 and is biased against the circular disc 146 by a spring-loaded pin 164. An ejection rod 166 is then actuated to forcibly eject the valve stem from the disc 146 and onto the valve stem holding pin 126. During ejection of a valve stem, the valve gate 162 will pivot out of the way to permit the valve stem to exit the disc 146. For example, if the disc 146 is rotated such that the first chamber 150 is disposed adjacent the valve stem holding pin 126, the ejection rod 166 will extend through the first passage 158 and strike the head of the valve stem contained within the first chamber 150. The holding pin 126 will be inserted through the head of the valve stem to securely retain the valve stem on the valve stem insertion tool 54.

The valve gate 162 can also be joined to an air cylinder (not shown) for actively controlling the valve gate 162. In this manner, the valve gate 162 could be used to reinsert a valve stem into the disc 146 after the valve stem has been ejected if it is later determined that the valve stem selected is the wrong size for the wheel in question.

The controller comprises a PLC, or programmable logic controller, which controls the timing and sequence of the various steps to be performed by the valve stemming apparatus 10. To control the camera and process the images therefrom, the PLC operates in conjunction with an industrial version of a personal computer equipped with an image processing board adapted to receive the video output of the camera 66. For example, the imaging processing board can be the Pulsar Series board manufactured by Matrox.

The operation of the valve stemming apparatus 10 will now be described with a first wheel beginning in the retaining apparatus 14. The retaining arms 22 are retracted into an open position such that the vertical rollers 24 move together and the rectangular pads 28 move apart to release the wheel. The roller conveyor 20 then transports the wheel onto the belt conveyor 50 until the wheel strikes the retractable stops 64. The vertical rollers are spaced sufficiently close such that they will block a second wheel from entering the retaining apparatus 14 while the first wheel is being transported to the operation station 12. After the wheel has advanced to the retractable stops 64, the belt conveyor 50 is turned off and the stops 64 are retracted.

Next, the centering arms 112 are advanced to engage and center the wheel within the operation station 12. At the same time, the retaining arms 22 are advanced to a closed position such that the vertical rollers 24 are moved apart and the rectangular pads 28 are moved together. A second wheel can then be advanced onto the roller conveyor 20 where it will remain until work on the first wheel is completed.

Figure 15:
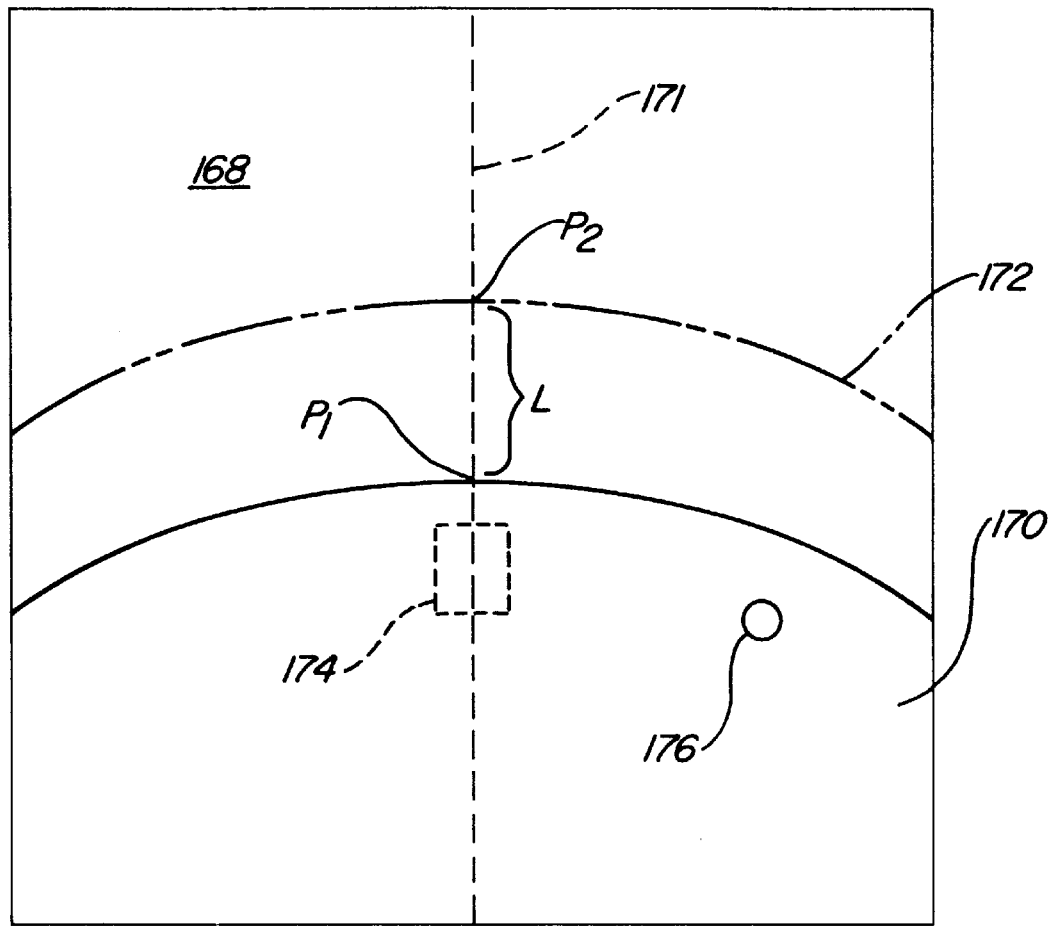
FIG. 15 illustrates the image of the wheel as viewed by the camera of the present invention.

After the first wheel has been centered, a portion of the wheel is in view of the camera and the controller analyzes an image of the wheel detected by the camera. As shown in FIG. 15, the image comprises a light background region 168 and a dark region 170 having a curved profile corresponding to the wheel. The image consists of an array of pixels wherein each pixel includes its own numerical coordinates with the origin being in an upper left corner of the image. Generally, the appropriate valve stem size can be determined by examining the color of the wheel. For example, a silver wheel may require a shorter valve stem whereas a black wheel may require a longer valve stem. The controller compares the intensity of the pixels within the wheel image 170 to one or more predetermined thresholds to determine whether the wheel is, for example, black or silver.

Next, the controller determines a high point $P_1$ of the wheel image 170 by examining each pixel in a preselected vertical line 171 beginning from the top of the image. The controller monitors the intensity of each pixel until the intensity drops below a preset threshold which will occur at the first pixel in the darkened wheel image 170. The controller then stores the coordinates of this pixel. The centering arms 112 are retracted while the high point $P_1$ of the wheel image 170 is being determined.

Based upon the detected color of the wheel, the controller can at this time determine whether a large or small valve stem will be required. The circular disc 146 of the valve stem loader 55 is then rotated to place the appropriate valve stem in a position to be retrieved by the valve stem insertion tool 54.

Next, the lifting assembly 52 is activated, raising the cone 76 between the first and second conveyor belts 56,58 and into engagement with the wheel. The wheel is raised into engagement with the cushioning pad 104 and is decelerated by the cushioning cylinder 108. The biasing means 96 engaged with the cone 76 also provides added cushioning between the cone 76 and the wheel. When fully raised, the wheel will rest against the horizontal rollers 110.

Next, air cylinder 144 is actuated to raise the valve stem insertion tool 54, after which the ejection rod 166 hits the valve stem and ejects the valve stem from the valve stem loader 55 onto the valve stem holding pin 126. The ejection rod 166 then continues forward as the insertion tool 54 is lowered. The ejection rod 166 is then retracted.

After the wheel has been firmly pressed against the horizontal rollers 40, the controller analyzes a second image from the camera 66 including a second wheel image 172 shown in phantom in FIG. 15. In the same manner as for the first wheel image 170, the controller will determine the high point $P_2$ of the second wheel image 172 by examining the same predetermined vertical line 171 until it locates a pixel having an intensity that is below a preset threshold. The vertical (Y-axis) coordinate of the high point $P_2$ of the second wheel image 172 is used to determine the diameter of the wheel by comparing this high point coordinate with preset coordinate ranges corresponding to particular wheel sizes.

Because the wheel has been raised, the high point $P_2$ will be displaced from high point $P_1$ along the Y-axis by a distance L. The distance L is initially measured as a number of pixels and is calculated by taking the difference between the Y-axis pixel coordinates of high points $P_1$ and $P_2$. The distance L is converted into engineering units, such as inches or millimeters, by multiplying the distance L by a Y-axis scaling factor.

The scaling factor is determined during calibration of the apparatus 10 by selecting two calibration points within the camera image whose relative positions, in terms of engineering units, are known. For example, these points can be selected as points on the frame 16 of the apparatus 10. The controller then determines the pixel coordinates of each calibration point and determines the relative distance between each point, in terms of pixels, in both the X-axis direction and the Y-axis direction. To determine the Y-axis scaling factor, the Y-axis distance, in engineering units, is divided by the Y-axis distance, in pixels, between the calibration points. If necessary, an X-axis scaling factor can also be computed by dividing the X-axis distance, in engineering units, by the X-axis distance, in pixels, between the calibration points. Because the distance L is measured only in the Y-axis, the X-axis scaling factor is generally unnecessary.

Once the distance L has been converted into engineering units, it can be used to determine the wheel width. Because the distance between the belt conveyor 50 and the horizontal rollers 40 is fixed, when the wheel is lifted against the rollers 40 the wheel will be displaced a distance inversely proportional to the wheel width. For example, if the distance from the belt conveyor 50 to the horizontal rollers 40 is 12 inches, a wheel 8 inches high will be able to move approximately 4 inches vertically, twice as far as a wheel 10 inches high which could only move 2 inches vertically.

The distance L as viewed by the camera 66 is a function of the distance that the wheel is raised. However, because the camera 66 views the wheel from an angle θ, the distance L will not correspond directly to the distance that the wheel is raised. The distance L can be converted into the distance that the wheel is raised by multiplying the distance L (in engineering units) times the sine of the camera angle θ. For example, if the distance between the rollers 40 and the belt conveyor 50 is 12 inches, the distance L is 11.7 inches, and the camera angle θ is 20 degrees, the distance the wheel is raised=(11.7)*(sin(20)=(11.7)*(0.347)=4 inches. The wheel width is then calculated by subtracting the distance the wheel is raised (4 inches) from the total distance between the rollers 40 and belt conveyor (12 inches) resulting in a calculated wheel width of 8 inches.

Depending upon the wheel diameter, the wheel will have one of several discrete wheel widths. To overcome any error in the calculated wheel width W, the controller compares the calculated wheel width W to predetermined ranges for the actual wheel width. The predetermined ranges will correspond to the particular diameter of the wheel (as calculated using the wheel high point $P_2$ as discussed above). Although the wheel width is sometimes not needed for the valve stemming process, this measurement is necessary for subsequent operations to be performed on the wheel at later stations in the wheel assembly line. In some instances, once the wheel width, diameter, and/or color are determined, the valve stem selection may be made.

Next, the valve stem opening in the wheel must be placed in a position ready to receive the valve stem. The cone 76 and friction ring 89 are initially rotated at high speed, causing the wheel to rotate against the horizontal rollers 40 at high speed. The controller monitors a predetermined area 174 within the second wheel image 172 until an image 176 of the valve stem opening moves within the area 174 and changes the intensity of the pixels therein. The area 174 is only slightly larger than the size of the valve stem image 176 because a larger area requires more time for the controller to scan and slows down the processing speed of the apparatus 10. The area 174 is positioned such that the vertical scan line 171 bisects the area 174.

When the valve stem opening is first detected, the rotation of the wheel is slowed. Due to the high speed of the wheel rotation, the wheel may not be able to stop before the valve stem image 176 has moved beyond the area 174. In this case, the wheel will stop and be rotated at a slower speed in a reverse direction until the center of the valve stem image 176 is aligned with the vertical scan line 171. Otherwise, the wheel is further advanced at a slower speed until the center of the valve stem image 176 is aligned with the vertical scan line 171.

The valve stem insertion tool 54 is next advanced into position adjacent the wheel and the valve stem is inserted into the valve stem opening. Specifically, the air cylinder 144 is actuated to drive the support plate 140 and, hence, the holding pin 126 of the valve stem insertion tool 54 upwardly to drive the valve stem into the valve stem opening.

The diameter of the wheel is used to determine how far to advance the valve stem insertion tool to place the insertion tool 54 adjacent the wheel without forcibly pressing the valve stem insertion tool 54 against the wheel and possibly damaging the wheel. At the same time, the circular disc 146 within the valve stem loader 55 is rotated such that the valve stem chambers 150,152 are aligned with the feeding tubes 154,156 to permit the valve stem previously ejected from the loader 55 to be replaced.

The valve stem insertion tool 54 is retracted away from the wheel and returned to a position adjacent to the valve stem loader 55 while the wheel is lowered back onto the belt conveyor 50. The belt conveyor 50 is then reactivated to move the wheel out of the operation station 12. After the wheel has left the operation station 12, the stops 64 are raised above the belt conveyor 50 and the entire process is repeated for the second wheel.

Although the description of this invention has been given with reference to a particular embodiment, it is not to be construed within a limiting sense. Many variations and modifications will no doubt occur to those skilled in the art. For a definition of the invention, reference is made to the appended claims.

What is claimed is:

1. A method for inserting a valve stem into a valve stem opening in a wheel including:

detecting an image containing at least a portion of the wheel;

monitoring an area within the image while disregarding portions of the image that are outside of the area;

rotating the wheel to place the valve stem opening in a predetermined position within the area; and maintaining the valve stem opening at the predetermined position while inserting the valve stem within the valve stem opening.

2. The method of claim 1 including:

rotating the wheel at a first speed until the valve stem opening is detected within the monitored area;

rotating the wheel at a second speed slower than the first speed until the valve stem opening is in the predetermined position within the image; and stopping the rotation of the wheel prior to said step of inserting the valve stem.

3. The method of claim 2 including:

positioning the wheel between a camera and a light source;

shining the light source at the camera and at the wheel; and using the camera to detect the image.

4. The method of claim 3 including illuminating the valve stem opening with the light source.

5. A method for processing a wheel including:

orienting the wheel relative to an optical sensor such that the optical sensor receives an image that includes a curved portion of the wheel;

determining the location within the image of a high point of the curved portion of the wheel; and determining a size characteristic of the wheel in accordance with the location within the image of the high point of the curved portion of the wheel.

6. The method of claim 5 including determining the high point by scanning along a single pre-selected scan line.

7. The method of claim 5 including the step of utilizing a camera as the optical sensor.

8. The method of claim 7 including inserting a valve stem within a valve stem opening in the wheel.

9. The method of claim 8 including:

placing the wheel within a work station;

performing said steps of orienting, determining, and inserting while the wheel is within the work station and before the wheel is removed from the work station.

10. The method of claim 8 further comprising the step of selecting the valve stem from among a plurality of valve stems of different sizes in accordance with the size characteristic of the wheel.

11. The method of claim 8 wherein the wheel is one of a plurality of different sizes, and wherein the method further includes the steps of:

analyzing the image to determine the wheel size; and utilizing the wheel size to determine an appropriate valve stem size for the wheel.

12. The method of claim 8 wherein the wheel is one of a plurality of different colors, and wherein the method further includes the steps of:

analyzing the image to determine the wheel color; and utilizing the wheel color to determine an appropriate valve stem size for the wheel.

13. The method of claim 7 including analyzing the image to determine the wheel diameter.

14. The method of claim 13 including:

advancing a valve stem insertion tool toward the wheel; and utilizing the wheel diameter to determine the distance to advance the valve stem insertion tool.

15. The method of claim 7 including analyzing the image to determine the wheel width.

16. The method of claim 5 including:

placing the wheel and the optical sensor in a first relative position;

while the wheel and optical sensor are in the first relative position, detecting at least a portion of the wheel with the optical sensor;

providing relative movement between the wheel and the optical sensor to place the wheel and optical sensor in a second relative position;

while the wheel and optical sensor are in the second relative position, detecting at least a portion of the wheel with the optical sensor;

analyzing the differences between optical sensor signals from when the optical sensor and wheel are in the first relative position compared to when the optical sensor and wheel are in the second relative position to determine a size characteristic of the wheel.

17. The method of claim 7 including:

detecting a first image of at least a portion the wheel using the camera;

providing relative movement between the camera and the wheel;

detecting a second image of at least a portion of the wheel using the camera after said step of providing relative movement; and analyzing the differences between the first and second images to determine a wheel size characteristic.

18. The method of claim 17 including inserting a valve stem within a valve stem opening in the wheel.

19. The method of claim 17 including analyzing the differences between the first and second images to determine the width of the wheel.

20. The method of claim 17 including analyzing the second image to determine the diameter of the wheel.

21. The method of claim 5 including:

placing a first valve stem having a first size onto a valve stem loader;

placing a second valve stem having a second size onto a valve stem loader;

selecting the first or second valve stem based upon the size characteristic of the wheel;

rotating the valve stem loader to position the selected valve stem adjacent a valve stem holder;

placing the selected valve stem on the valve stem holder; and inserting the selected valve stem into a valve stem opening within the wheel.

* * * * *